United States Patent [19]

Detroit

[11] Patent Number: 4,752,317
[45] Date of Patent: Jun. 21, 1988

[54] CONTROLLED RELEASE FORMATION FOR UREA

[75] Inventor: William J. Detroit, Schofield, Wis.

[73] Assignee: Reed Lignin, Inc., Rothschild, Wis.

[21] Appl. No.: 752,893

[22] Filed: Jul. 8, 1985

[51] Int. Cl.$^4$ .............................................. C05C 9/00
[52] U.S. Cl. ........................................ 71/28; 71/64.11
[58] Field of Search ................ 71/28, 64.11, 11, 27, 71/29, 30, 64.13

[56] References Cited

U.S. PATENT DOCUMENTS 3,697,245 10/1972 Dilday ...................................... 71/28

FOREIGN PATENT DOCUMENTS 0952831 8/1982 U.S.S.R. ............................ 71/64.11

OTHER PUBLICATIONS

CA 96(18) 145844v, "Drilling Fluid Composition", Kelley et al., 1982.
CA 93(24) 222092r, "Study on . . . Monomers", Chen et al., 1980.

*Primary Examiner*—Ferris H. Lander
*Attorney, Agent, or Firm*—Andrus, Sceales, Starke & Sawall

[57] ABSTRACT

A hydrolyzed lignosulfonate-acrylonitrile graft copolymer matrix providing slow release solubility to urea fertilizer. The hydrolysis of the graft copolymer of lignosulfonate and acrylonitrile may be carried out in the presence of a caustic in situ during the urea prill manufacturing process or in a prehydrolysis step with subsequent use of the hydrolyzed copolymer in the urea prill manufacturing process to provide the controlled release formulation for urea.

8 Claims, No Drawings

CONTROLLED RELEASE FORMATION FOR UREA

BACKGROUND OF THE INVENTION

The present invention relates to urea fertilizers, and more particularly to a controlled release formulation for urea fertilizers.

Fertilizers are generally classified into two major groupings, namely, natural organic products and synthetic chemical products. Synthetic chemical product examples would be urea, ammonia phosphates, and many others. Natural organic products are typically by-products from processing of animal or vegetable substances that contain plant nutrients of value as fertilizers. Currently, the three principal types of commercialized natural organic materials are activated sewage sludge, co-polymerized leather tankage, and hydrolyzed leather meal. Sludge is typically filtered off from an aeration reactor and heat dried for commercial use as a slowly soluble nitrogen source available through microbial degradation. However, because of its low nutrient value sludge is generally used only as a base for fertilizers sold particularly to the home and garden market. Various materials containing unavailable nitrogen as keratin are used to make process tankage. The principal commercial products are manufactured from leather scrap by treatment with steam under pressure. This treatment hydrolyzes the keratin to purines and amino acids which are more available nitrogen sources. A co-polymer of leather tankage and methylene urea is also available.

Controlled release fertilizers include natural organic and synthetic chemical products in which the release or availability of plant nutrients is in some way deliberately regulated so as to distribute the nutrient uptake over time. Controlled nutrient uptake can be achieved either through modification of the fertilizer product itself, e.g. reduced solubility, coating, or encapsulation, or through regulation of nutrient availability by the plant, e.g. nitrification inhibitors. In general, controlled release fertilizers have the following advantages over natural organic sources. First, controlled release fertilizers provide a reduction in the nutrient losses that occur between application and uptake by the plant. Secondly, controlled release fertilizers provide for the reduction of nitrogen toxicity, particularly to seedlings, caused by high ionic concentrations associated with rapid dissolution of soluble organic fertilizers or from the evolution of ammonia by hydrolysis of urea salts. Finally, controlled release fertilizers provide a reduction in the number of fertilizer applications necessary thus resulting in substantial cost savings.

The above advantages are particularly advantageous with respect to nitrogen sources for plants because more avenues of nitrogen loss exist than for phosphorous and potassium. For example, denitrification of anhydrous ammonia can cause volatilization losses of ammonia, and nitrogen may be removed from the root zones of plants because of leeching or other movement of these nutrients in the soil. This loss is a particular problem in porous or sandy soils, soil subject to heavy rainfall, soils with substantial ground water movement and runoff, and areas that are heavily irrigated. Also, nitrogen may become unavailable to the plant if it forms an insoluable compound in the soil.

The most common method of modifying the fertilizer product itself to provide controlled nutrient release is to control the solubility of the fertilizer. In the case of urea, such products are typically made by reacting the urea with various aldehydes to reduce the solubility of the material. For example, isobutylidene diurea (IBDU), as described in U.S. Pat. No. 3,322,528, is a condensation product of urea and isobutyraldehyde which contains about 31% nitrogen of which 90% is water insoluble. The rate of nitrogen release is a function of soil moisture and the size of the IBDU particle so that the more moisture available and the finer the particle size, the more rapid the rate of nitrogen release.

Urea has also been reacted with formaldehyde and consists mainly of methylene urea polymers varying in chain length and degree of cross linking. Nitrogen is released from the insoluble portion of these materials by microbial degradation and therefore factors such as soil moisture, temperature, pH, nutrient content and oxygen which influence the rate of microbial activity also effect the rate of nitrogen release. As with the production of IBDU, the urea actually takes part in the reaction to form urea formaldehydes.

Modification of the fertilizer product to control the amount of nutrient uptake can also be achieved by coating soluble fertilizers to meter the nitrogen release. Coatings are generally classified into one of three types. First, there are semipermeable membranes which are broken down by internal osmotic water pressure built-up by vapor diffusion. Release of the nitrogen from the soluble fertilizer is usually complete once the coating is broken. Another type of coating involves the use of impermeable membranes with small pores. In this type of coating water passes through the coating and dissolves the fertilizer, causing swelling of the capsule and enlargement of the pores. The dissolved fertilizer then diffuses through the enlarged pores in the coating. Finally, impermeable membranes without pores are utilized to coat soluable fertilizers. In this type of coating, chemical, physical or microbial action degrades the membrane material before fertilizer release occurs, and nutrient release is usually complete once the coating is degraded.

Several controlled release products are polymer coatings based on impermeable membranes with small pores to coat prilled, soluble fertilizers. Release of the nutrients can be varied by changing the thickness of the coating. The rate of release is also governed by soil temperature i.e. higher temperatures increase the nutrient release rate. One such material is a fertilizer coated with a copolymer of dicyclopentadiene with glycerol ester. Nutrient release varies with the thickness of the coating which ranges between 4% and 15% of the finished product weight. Another type of polymer coated fertilizer consists of coated urea, ammoniated superphosphoric acid, and potassium chloride. In this case, the nutrients are released through microscopic pores in the capsule wall which includes a low molecular weight polyethylene.

Sulfur coated urea has also been utilized to provide a controlled release fertilizer. Nitrogen release is based upon the thickness and completeness of the sulfur coating, the soil moisture, and the soil temperature. Increased soil moisture and temperature accelerate the degradation of the impermeable sulfur coating and thus the diffusion of urea through the pores in the coating. For such products, the rate of nitrogen release is expressed as a seven day dissolution rate. The seven day dissolution rate is measured as the percentage of urea that dissolves when a 50 gram sample of the product is immersed in 250 ml of water at 37.8° C. for seven days. Typically, these products have seven day dissolution rates of between 25% and 35% which indicates a rapid initial rate of nitrogen release.

As previously mentioned, controlled release of the fertilizer nutrients may also be accomplished through nitrification inhibitors. Nitrification is the process which converts ammonium ions, when applied to the soil as ammonium nitrogen, by bacterial oxidation to nitrate ions. Certain materials inhibit nitrification because they are toxic to the soil bacteria that oxidize ammonium ions. For example certain pesticides and chemicals such as nitropyrine and chlorinated pyridines are toxic to the bacteria that convert ammonium ions to nitrate. Thus, these types of inhibitors delay conversion of ammonium nitrogen to nitrate by specifically inhibiting the activity of the soil bacteria.

A controlled release mechanism can also be achieved by combining soluble fertilizers with carriers such as glass, diatomaceous earth, waxes, parafins, polymers or resins. One of these products is based on formulating micronutrient ingredients with slowly soluble glass and fritted materials. These materials are made by mixing trace elements of iron, zinc, manganese, copper, boron, or molybdenum with silicates, borates, or phosphates used to make glass. The mixture is then homogenized in a smelting process and the resultant solid mass is shattered and ground to the finished product.

Another product is based on mixing fertilizer ingredients with a suitable binder to produce a highly compacted product sold as a spike or tablet.

SUMMARY OF THE INVENTION

A hydrolyzed lignosulfonate-acrylonitrile copolymer matrix providing slow release solubility to urea.

The hydrolysis of the graft copolymer of lignosulfonate-acrylonitrile may be carried out with caustic, such as lithium, potassium, or sodium hydroxide, in situ directly in the urea prill manufacturing evaporation process or in a prehydrolysis step with subsequent use of the hydrolized copolymer with urea in the prill manufacturing process to provide the slow release formulation. In both cases, lignosulfonate is first graft copolymerized with acrylonitrile in various loadings of 5 to 200% of acrylonitrile with 30 to 60% preferred.

In the former case, the graft copolymer of lignosulfonate-acrylonitrile is treated with caustic, such as lithium, potassium or sodium hydroxide at 10 to 200% based on copolymer solids, with 30 to 60% preferred, and either spray dried or used as a liquid. The causticized material is then mixed with a urea solution and heated to about 285° F. to evaporate the water in the urea solution. This in situ heating hydrolyzes the lignosulfonate-acylonitrile copolymer to a lignosulfonate-polyacrylic acid copolymer. The molten urea is then injected as droplets to an air cooling tower where crystalline urea is formed as a hard prill or bead of urea used for shipment. The hydrolized graph copolymer of lignosulfonate-polyacrylic acid is the matrix that protects the urea to decrease its solubility and provide a slow release formulation for a urea fertilizer.

In the latter case, a prehydrolyzed copolymer is formed for use in the prill manufacturing process by treating the graft copolymer with caustic and hydrolyzing it at a desired temperature for a desired amount of time to form the copolymer matrix of lignosulfonate-polyacrylic acid. The prehydrolyzed copolymer is then neutralized to about 9.0 pH with any mineral acid such as sulfuric, phosphoric or nitric acid. This material, when added to urea at the desired solids concentration in water, preferably 70%, prior to water removal, and then the subsequent water removal therefrom in the prill manufacturing process will protect the urea from rapid solubility.

In either of the above two procedures, the graft copolymer loading on urea in the prill manufacturing process is about 2 to 20% with 5 to 10% preferred.

DESCRIPTION OF THE PREFERRED EMBODIMENT

In preparing the controlled release formulation of the present invention, the first step is to prepare a graft copolymer of lignosulfonate with acrylonitrile. The acrylonitrile loading on lignosulfonate may be 5% to 200% with 30 to 60% preferred. 5% is the practical lower limit at which the present invention begins to protect urea from solubility i.e. increases insolubility of urea from about 10 to 20 times that of untreated urea. Likewise, 200% is the practical upper limit since beyond 200% poor crystallization will occur due to the excess acrylonitrile. Also, beyond this upper limit a poor matrix will form due to an insufficient amount of lignosulfonate present in the matrix.

Without wishing to be bound by any particular theory, it is thought that the graft copolymerization theory of a lignosulfonate with acrylonitrile entails classical, radical chain (addition) polymerization mechanisms. Initiation is carried out with a peroxide to form a free radical terminus. The chain radical formed in the initiation step is capable of adding successive monomers to propagate the chain. Propagation will continue until the supply of monomer is exhausted. However, classical termination reactions of the lignosulfonate require effective new initiation of free radical sites throughout the reaction by peroxide. Also, chain transfer as well as retardation mechanisms may also be present.

As used herein, the term "Kraft lignin" has its normal connotation, and refers to the substance which is typically recovered from alkaline pulping black liquors, such as are produced in the Kraft, soda and other well known alkaline pulping operations. The term "sulfonated lignin", as used in the specification, refers to the product which is obtained by the introduction of sulfonic acid groups into the Kraft lignin molecule, as may be accomplished by reaction of the Kraft lignin with sulfite or bisulfite compounds, so that Kraft lignin is rendered soluble in water. As used herein, the term "sulfite lignin" refers to the reaction product of lignin which is inherently obtained during the sulfite pulping of wood, and is a principle constituent of spent sulfite liquor. The term "lignosulfonate" ($LSO_3$) encompasses not only the sulfite lignin, but also the sulfonated lignin herein above described. Any type of lignosulfonate i.e. hardwood, softwood, crude or pure may be employed during the graft copolymerization step. Lignosulfonates are available from numerous sources, such as from Reed Lignin, Inc. under the trade designation "Lignosol".

Acrylonitrile (AN) is a commonly available chemical having the chemical formula $CH_2=CHCN$. Acrylonitrile may be prepared by the dehydration of ethylene cyanohydrin or acrylamide, and is available from numerous sources such as Aldrich Chemical Co. and Fisher Chemical Co.

Illustrative of the copolymerization of lignosulfonate with acrylonitrile is the following schematic reaction:

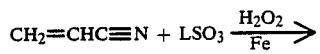

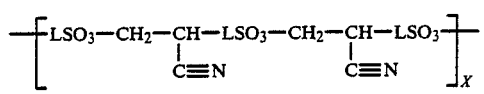

The following examples demonstrate the preparation of three different graft copolymers of lignosulfonate and acrylonitrile, i.e. polyacrylonitrile (PAN), in various loadings of acrylonitrile. It should be noted that the ferrous sulfate heptahydrate is a catalyst utilized along with hydrogen peroxide to initiate free radicals for the polymerization. Propagation of the chain is continued through the use of hydrogen peroxide.

EXAMPLE 1

| Reactants | Total Weight (grams) | Solids (grams) |
|---|---|---|
| Lignosol X (43.4%) | 461 | 200 |
| Water | 400 | — |
| Acrylonitrile (125 ml) | 100 | 100 |
| Ferrous Sulfate Heptahydrate | 0.2 | 0.2 |
| Total | 1001.2 grams | 300.2 grams |

The above total weight chemicals were mixed and heated to reflux temperature (70°-100° C.). 25% concentration hydrogen peroxide in water was added dropwise—1 ml. per 5 minutes for 3 hours and 35 minutes (total 43 mls.).

Excess acrylonitrile amounting to 5.8 mls. was distilled off for recycle.

Recovered: 912 grams total weight, 277 grams solids, pH 5.2, Viscosity at 100 rpm Brookfield=12,960 cps, Viscosity at 20 rpm Brookfield=34,600 cps.

EXAMPLE 2

| Reactants | Total Weight (grams) | Solids (grams) |
|---|---|---|
| Hardwood Sugar Destroyed SSL (Xyrofin 50%) | 200 | 100 |
| Water | 400 | — |
| Acrylonitrile (125 mls.) | 100 | 100 |
| Ferrous Sulfate Heptahydrate | 0.2 | 0.2 |
| Total | 700.2 grams | 200.2 grams |

The above total weight chemicals were mixed and heated to reflux temperature (70°-96° C.). Hydrogen peroxide (25% concentration in water) was added dropwise (1 ml. per 5 minutes) for 3 hours and 50 minutes (total 46 mls.).

Excess acrylonitrile amounting to 1.6 mls. was distilled off for recycle.

Recovered: 692 grams total weight at 28% solids, =194 gms. solids and pH 4.7, Viscosity at 100 rpm Brookfield=305 cps, Viscosity at 20 rpm Brookfield=375 cps.

EXAMPLE 3

| Reactants | Total Weight (grams) | Solids (grams) |
|---|---|---|
| Lignosol X (50%) | 400 | 200 |
| Water | 440 | — |
| Acrylonitrile (100 mls.) | 80 | 80 |
| Ferrous Sulfate Heptahydrate | 0.2 | 0.2 |
| Total | 920.2 grams | 280.2 grams |

The above total weight chemicals were mixed and heated to reflux temperature (69°-96° C.) and reacted while hydrogen peroxide initiator (25% concentration) was added dropwise (1 ml. per 5 minutes) for 2 hours and 25 minutes (total 29 mls.).

Excess acrylonitrile amounting to 3.9 mls. was distilled off for recycle.

Recovered: 878 grams at 31%=272 grams of solids, pH 5.2, Viscosity at 100 rpm Brookfield=6240 cps, Viscosity at 20 rpm Brookfield=9000 cps.

Other examples are shown in Table I to illustrate the preparation of the graft copolymer (PAN) of lignosulfonate and acrylonitrile.

TABLE I

LIGNOSULFONATE - PAN GRAFT COPOLYMERS
REACTION CONDITIONS

| Raw Material | Acrylo-Nitrile, % | Time, hrs. | Temp., C. | Total Solids % | Final pH | Viscosity at 20 rpm, cps |
|---|---|---|---|---|---|---|
| Lignosol X | 50 | 3 | 96 | 30 | 5.2 | 34,000 |
| Lignosol X | 40 | 2 | 96 | 30 | 5.2 | 9,000 |
| Lignosol X | 40 | 2 | 96 | 30 | 5.4 | 14,800 |
| Lignosol X | 35 | 2 | 96 | 26 | 5.4 | 4,900 |
| Lignosol X | 25 | 2 | 96 | 30 | 5.6 | 20 |
| Norlig A | 50 | 5 | 96 | 30 | 3.7 | 250 |

In a caustic environment, PAN graft copolymers prepared in the above manner may be hydrolyzed to give a graft copolymer of lignosulfonate and polyacrylic acid (PAA) which thickens or insolubilizes depending upon the graft copolymer loading of acrylonitrile. Hydrolysis may occur at room temperature, but would take 1-2 days to complete. Therefore, hydrolysis is preferred to occur at elevated temperature where shorter periods of time are needed to complete the process. For example, complete hydrolysis occurs, depending upon the acrylonitrile loading and the caustic loading, if the causticized copolymer is heated at 90° C. for 0.5 to 3.0 hours. Also, as noted below, heating at 275° F. during the urea prill evaporation process sufficiently hydrolyzes the copolymer. Thus, graft copolymers, such those as of Examples I-III, are treated with caustic, such as lithium, potassium, or sodium hydroxide at a loading of 10 to 200% with 30 to 60% preferred based on caustic to PAN copolymer solids. The caustic loading is dictated by the amount of acrylonitrile solids and a sufficient amount of caustic should be used to hydrolyze all of the acrylonitrile. Use of an excess of caustic will merely provide a high pH product which may be undesirable for certain applications. This causticized product may then be spray dried or used as a liquid during either of the following two preferred hydrolysis steps, i.e. (1) in situ during prill production or (2) in a prehydrolyzed system.

In present urea prill production, urea at 70% solids concentration in water is heated in evaporators to about 285° F. to remove substantially all the water. The molten urea is then injected as droplets to an air cooling tower where crystalline urea is formed as a hard prill or bead of urea used for shipment. With the present process, 5% to 20% of causticized lignosulfonate acrylonitrile graft copolymer may be added to the 70% urea solution prior to heating. The heating procedure for evaporation of the water at 285° F. is sufficient to hydrolyze the graft copolymer of lignosulfonate and acrylonitrile (PAN) to a graft copolymer of lignosulfonate-polyacrylic acid (PAA). The causticized lignosulfonate acrylonitrile graft copolymer loading on urea is 2 to 20% with 5 to 10% preferred. With loading over 20% poor crystallization results, and with loading under 2% an insufficient matrix is formed which does not protect the urea for a sufficient amount of time. The graft copolymer-caustic system is soluble in molten urea and crystallizes with the urea when cooled. The hydrolyzed graft copolymer of lignosulfonate-polyacrylic acid is the matrix that protects urea from rapid dissolving and once the molten urea and hydrolyzed graft copolymer are crystallized it is believed that the hydrolyzed graft copolymer matrix serves to encase or entrap the urea providing slow release for the urea. Examples are shown in the screening method results herein where urea dissolving time has been increased from one minute, 38 seconds to about 55 minutes.

As an alternative to the in situ graft copolymer-caustic system described above wherein hydrolysis occurs during the urea evaporation step in the prill manufacturing process, a pre-hydrolyzed copolymer can also be used with urea to obtain the insoluble matrix surrounding the urea to provide the slow release effect. In this case a graft copolymer of lignosulfonate and acrylonitrile, such as those in Examples I-III, is treated with caustic, such as lithium, potassium or sodium hydroxide and hydrolyzed independently of the urea evaporation step referred to above. Preferably, hydrolyzation occurs at 90° C. for approximately 0.5 to 3.0 hours depending upon caustic and acrylonitrile loading, although any desired temperature and time period may be employed. Hydrolysis of the copolymer pendant nitrile groups occurs and a lignosulfonate-polyacrylic acid copolymer matrix is formed that may also be used to protect the urea from rapid solubility. The hydrolyzed graft copolymer is then neutralized to about 9.0 pH with any mineral acid such as sulfuric, phosphoric or nitric acid. This material may then be spray dried for shipment or may be shipped in liquid form, and mixed with the 70% urea solution prior to water removal. After evaporation of the water from this mixture at 285° F. this system is then cooled in the above described manner to form urea prill to provide the slow release formulation. In this pre-hydrolysis method, AN loading on LSO₃, caustic loading, and PAA loading on urea is identical to that described above for the in situ hydrolysis process.

Illustrative of the hydrolysis of the graft copolymer LSO₃-PAN is the following schematic reaction:

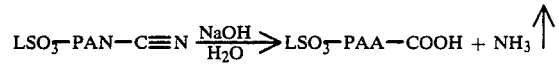

$$LSO_3^--PAN-C\equiv N \xrightarrow[H_2O]{NaOH} LSO_3^--PAA-COOH + NH_3 \uparrow$$

The following procedure is utilized in obtaining the solubility screening referred to above and reported in Tables II and III:

1. Weigh 10 grams of urea.
2. Add graft copolymer caustic system or prehydrolized copolymer at the desired loading based on urea.
3. Add water to a final urea concentration of 70%.
4. Distill water and heat the molten urea mixture to 285° F. in less than 5 minutes.
5. Cool rapidly to crystalize.
6. Break the crystalized mass and obtain a 0.4–0.45 gram solid piece.
7. Add the sample to 100 cc of water at 20°–25° C.
8. With intermittent swirling, measure the time to completely dissolve the urea. Record as solubility index.
9. Measure the pH of a 3% solution and record.

The following test results have been obtained by utilizing the above procedures. Table II represents test results utilizing the copolymer-caustic in situ system and Table III represents results utilizing the prehydrolyzed system.

TABLE II

| Graft Copolymer - Caustic In Situ System | | | |
|---|---|---|---|
| Product | Treatment, % on Urea | Solubility Index, Mins. - Secs. | 3% Solution Final pH |
| Control Urea Evaporated to 285° F. | — | 2 - 25 | 9.2 |
| Control Urea + 3.3% NaOH Evaporated to 285° F. | — | 1 - 38 | 9.9 |
| Desugared Hardwood SSL 100% PAN - 50% NaOH | 10 | 55 - 0 | 9.1 |
| Desugared Hardwood SSL 100% PAN - 50% NaOH | 5 | 30 - 0 | 9.6 |
| Lignosol X 50% PAN - 50% NaOH | 10 | 50 - 20 | 9.3 |
| Lignosol X 50% PAN - 50% NaOH - Powder | 10 | 32 - 20 | 9.7 |
| Lignosol X 40% PAN - 30% NaOH | 10 | 17 - 35 | 9.4 |
| Lignosol X 40% PAN - 40% NaOH | 10 | 43 - 0 | 9.3 |
| Lignosol X 40% PAN - 50% NaOH | 10 | 47 - 0 | 9.2 |
| Lignosol X 40% PAN - 60% NaOH | 10 | 53 - 35 | 9.4 |

TABLE III

| GRAFT COPOLYMER PREHYDROLYSIS SYSTEM | | | | | | | | | |
|---|---|---|---|---|---|---|---|---|---|
| | REACTION CONDITIONS | | | | COPOLYMER PROP. | | UREA PRILL PROCESS (10% Loading on urea) | | |
| PRODUCT | SOLIDS, % | NaOH, % | TIME, hr. | TEMP., °C. | pH | VISCOSITY, 20 rpm. cps | SOL. (1) INDEX Min.' Sec." | 3% Final Test pH | Polymer Test pH |
| 40% PAN LX | 20 | 50 | 1 | 90 | 12.8 | 26,000 | 56' 0"(L) | 8.0 | 9.5 |
| | 10 | 40 | 3 | 90 | 12.9 | 1,300 | 57' 0"(L) | 8.0 | 9.7 |
| | | | | | | | 60' 40"(P) | 9.4 | 12.9 |
| | 20 | 20 | 3 | 90 | 12.0 | 93,000 | 40' 0"(L) | 8.2 | 8.6 |
| | 20 | 10 | 3 | 90 | 10.4 | 45 | 26' 45"(L) | 8.9 | 10.4 |
| | 10 | 30 | 3 | 90 | 12.8 | 2,100 | 55' 10"(P) | 9.3 | 12.8 |

TABLE III-continued

| | GRAFT COPOLYMER PREHYDROLYSIS SYSTEM | | | | | COPOLYMER PROP. | | UREA PRILL PROCESS (10% Loading on urea) | | |
|---|---|---|---|---|---|---|---|---|---|---|
| | REACTION CONDITIONS | | | | | | VISCOSITY, | SOL. (1) | 3% Final | Polymer |
| PRODUCT | SOLIDS, % | NaOH, % | TIME, hr. | TEMP., °C. | pH | | 20 rpm. cps | INDEX Min.' Sec." | Test pH | Test pH |
| 35% PAN LX | 10 | 40 | 3 | 90 | 12.9 | | 100 | 52' 30"(P) | 9.6 | 12.9 |
| | 10 | 30 | 3 | 90 | 12.7 | | 174 | 63' 35"(P) | 9.4 | 12.7 |
| UREA PRILL CONTROL | — | — | — | — | — | | — | 1 38" | 9.9 | — |

(1) L = Liquid Hyd. sample tested.
P = Powder Hyd. sample tested.

It is clear from the above Tables that urea insolubility has increased dramatically when the matrix of the present invention is employed therewith.

A slow release formulation has been described with comprises a hydrolyzed lignosulfonate-acrylonitrile graft copolymer matrix capable of giving slow release solubility to urea fertilizer. The hydrolysis of the graft copolymer lignosulfonate-acrylonitrile may be carried out in situ during the urea prill manufacturing process or in a prehydrolysis step with subsequent use of the hydrolyzed copolymer with urea in the prill manufacturing process.

Various modes of carrying out the invention are contemplated as being within the scope of the following claims particularly pointing out and distinctly claiming the subject matter which is regarded as the invention.

I claim:

1. A composition of matter, comprising urea and a hydrolyzed lignosulfonate-acrylonitrile copolymer matrix capable of providing slow release solubility for the urea wherein the loading of the hydrolyzed copolymer to urea is about 2% to about 20% and the loading of acrylonitrile to lignosulfonate in the copolymer is about 5% to about 200%, and said copolymer matrix is hydrolyzed with a caustic selected from the group consisting of lithium, potassium and sodium hydroxide, and wherein the loading of caustic to lignosulfoate-acrylonitrile is about 10% to about 200%.

2. The composition of claim 1, wherein the loading of acrylonitrile to lignosulfonate is about 30% to about 60%.

3. The composition of claim 1, wherein the loading of caustic to lignosulfonate-acrylonitrile is about 30% to about 60%.

4. The composition of claim 1, wherein said lignosulfonate is selected from the group consisting of a sulfite lignin, and a sulfonated lignin.

5. In a urea fertilizer prill manufacturing process, a method of providing slow release for the urea fertilizer comprising the steps of:
providing a lignosulfonate-acrylonitrile copolymer having a loading of acrylonitrile to lignosulfonate in the copolymer of about 5% to about 200%;
hydrolyzing the copolymer in caustic selected from the group consisting of lithium, potassium, and sodium hydroxide with the loading of caustic to copolymer about 10% to about 200%;
incorporating the hydrolyzed copolymer in a urea solution with the loading of hydrolyzed copolymer to urea about 2% to about 20%;
heating the urea solution and hydrolyzed copolymer to evaporate water therefrom; and
forming prill from the water-evaporated urea and copolymer solution.

6. The process of claim 5, wherein said lignosulfonate is selected from the group consisting of a sulfite lignin and a sulfonated lignin.

7. In a urea fertilizer prill manufacturing process, a method of providing slow release for the urea fertilizer comprising the steps of:
providing a urea solution containing a lignosulfonate-acrylonitrile copolymer and caustic selected from the group consisting of lithium, potassium and sodium hydroxide, and wherein the loading of caustic to lignosulfonate-acrylonitrile is about 10% to about 200% with the loading of acrylonitrile to lignosulfonate in the copolymer about 5% to about 200% and the loading of hydrolyzed copolymer to urea about 2% to about 20%;
heating the urea solution containing the copolymer and caustic to simultaneously hydrolyze the copolymer and evaporate water therefrom; and
forming prill from the water-evaporated urea and copolymer solution.

8. The process of claim 7, wherein said lignosulfonate is selected from the group consisting of a sulfite lignin and a sulfonated lignin.

* * * * *